Sept. 20, 1949.    R. A. GEISELMAN    2,482,474
REGULATING SYSTEM
Filed June 1, 1948
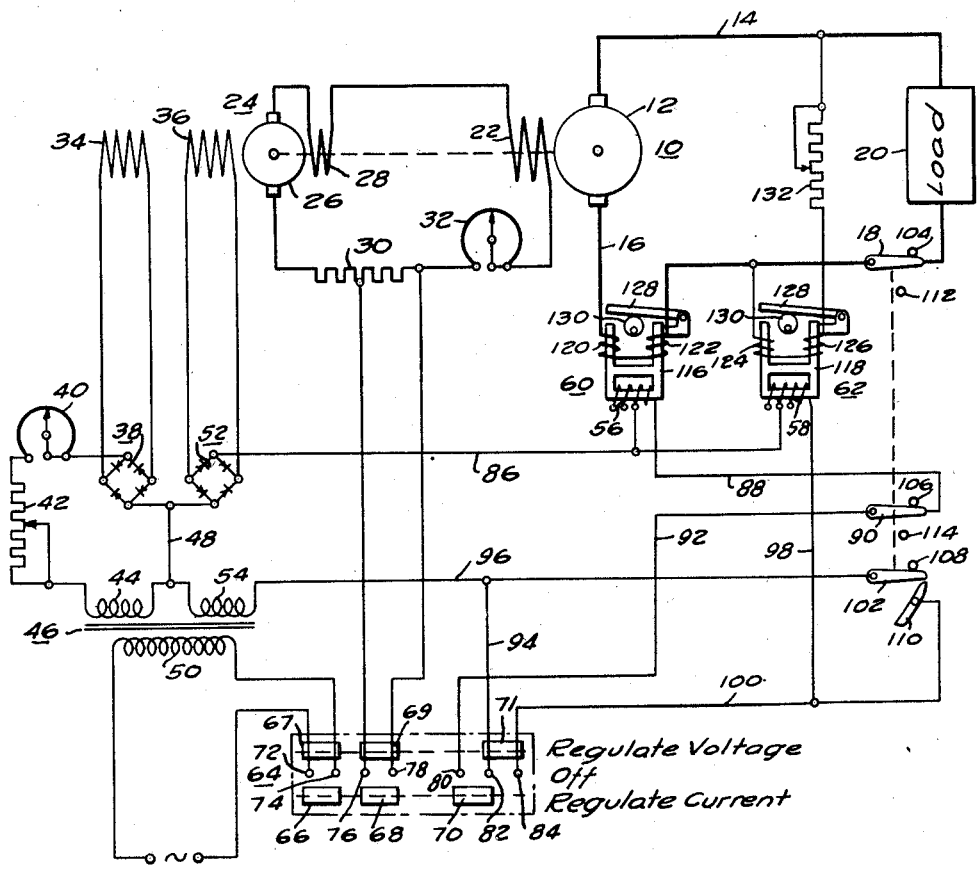
WITNESSES:
E.G. McCloskey
New. L. Groome
INVENTOR
Ralph A. Geiselman.
BY
James K. Ely
ATTORNEY Patented Sept. 20, 1949

2,482,474

UNITED STATES PATENT OFFICE 2,482,474

REGULATING SYSTEM

Ralph A. Geiselman, Pittsburgh, Pa., assignor to Westinghouse Electric Corporation, East Pittsburgh, Pa., a corporation of Pennsylvania Application June 1, 1948, Serial No. 30,405

5 Claims. (Cl. 322—25)

This invention relates to regulating systems and, in particular, to regulating systems for direct-current generators of the low-voltage, high-current type.

This application is a continuation-in-part of my copending application, Serial No. 703,051, filed October 12, 1946, now abandoned.

Heretofore, it has been difficult to provide suitable regulating systems for regulating the flow of direct current from a low-voltage, high-current type of direct-current generator, for example, one rated at below 50 volts and above 100 amperes, because the known systems require so much energy that it is undesirable to apply the energizing or measuring circuit of the regulating system to a low-voltage shunt, whereas the current output of such a generator is so large that changes therein have little effect on the regulating systems. For example, a 50 millivolt shunt for energizing the measuring circuit in such regulating systems is impractical on a six-volt circuit as the loss in the shunt is a large percentage of the total capacity of the direct-current generator supplying the circuit.

An object of this invention is the provision of a simplified regulating system for selectively regulating the current and voltage of a direct-current generator of the low-voltage, high-current type.

Another object of this invention is to provide a regulating system for a low-voltage, high-current, direct-current generator in which a pair of reactors having direct-current control windings connected to be responsive to the output of the generator are utilized and selectively connected in the regulating system for selectively effecting the regulation of the current output and voltage of the generator.

Other objects of this invention will become apparent from the following description when taken in conjunction with the accompanying drawing, the single figure of which is a schematic diagram of the circuits and apparatus embodying this invention.

Referring to the drawing, there is illustrated a direct-current generator 10 of the low-voltage, high-current type having its armature winding 12 disposed to be connected by conductors 14 and 16 through a load switch 18 to a load 20. The generator 10 is provided with a separately excited field winding 22 disposed to be energized in accordance with the output of a regulating generator 24.

In this instance, the regulating generator 24 is of the self-excited type and comprises the armature winding 26 connected at one terminal through a series field winding 28 to one side of the generator field winding 22, the other terminal of the armature winding 26 being connected through a resistor 30 and a field rheostat 32 for generator 10 to the other side of the field winding 22. The regulating generator 24 is also provided with a pair of opposed field windings 34 and 36 for controlling the excitation thereof.

The field winding 34 is disposed to be energized at a substantially constant or predetermined level to constitute a pattern or reference field, such field winding aiding in the effect of the series field winding 28 on the excitation of the generator 24. As illustrated, the field winding 34 is connected across the output terminals of a full-wave rectifier 38, one of the input terminals of which is connected through an adjustable rheostat 40 and adjustable resistor 42 to a terminal of the secondary winding 44 of transformer 46, the other input terminal of the rectifier 38 being connected by conductor 48 to the other terminal of the secondary winding 44. The primary winding 50 of transformer 46 is disposed to be connected to any suitable source of power, as shown.

The field winding 36 is connected across the output terminals of a full-wave rectifier 52, one of the input terminals of which is connected by conductor 48 to one end of another secondary winding 54 of transformer 46 and the other input terminal being disposed to be selectively connected through the alternating-current winding 56 or 58 of reactors 60 and 62, respectively, to the other end of the secondary winding 54 of transformer 46.

In order to selectively control the connection of the reactors 60 and 62 in the energizing circuit for the differential field winding 36, a drum switch 64 is utilized, the drum having three conducting segments 66, 68 and 70 aligned to engage contact members 72—74, 76—78 and 80—82, respectively, when actuated to a contact making position and three conducting segments 67, 69 and 71 aligned to engage contact members 72—74, 76—78 and 82—84 when actuated to another contact making position. In the neutral or "off" position, all of the segments of the drum are in open circuit position.

When the drum 64 is moved to the current regulating position where segment 70 bridges contact members 80 and 82, a circuit is closed which extends from one terminal of the secondary winding 54 through conductor 48 to one of the input terminals of the full-wave rectifier 52, from the other of the input terminals of rectifier 52 through conductor 86, the alternating current winding 56 of reactor 60, conductor 88, switch 90, conductor 92, contact member 80, segment 70, contact member 82 and conductors 94 and 96 to the other terminal of the secondary winding 54.

If the drum 64 is moved to the voltage regulating position where segment 71 bridges contact members 82 and 84 then a circuit is established extending from one terminal of the secondary winding 54 through conductor 48 to one of the input terminals of the full-wave rectifier 52 and from the other input terminal of the rectifier 52 through conductor 86, the alternating current winding 58 of reactor 62, conductors 98 and 100, contact member 84, segment 71, contact member 82 and conductors 94 and 96 to the other terminal of the secondary winding 54.

In addition to the switch 90, there is also provided a switch 102 disposed for movement simultaneously with the switch 90 and the load switch 18. As illustrated, the switches 18, 90 and 102 are mechanically linked together so that when the load switch 18 is in circuit closing position against a stop 104, switch 90 is also in a circuit closing position against a cooperative stop 106 and switch 102 is in a circuit interrupting position against a cooperative stop 108. When switch 18 is actuated to a circuit interrupting position, switch 90 is also moved to a circuit interrupting position, whereas switch 102 is actuated to a circuit closing position, the switch 102 engaging an elongated contact member 110 in sliding engagement. Stops 112 and 114 are provided for limiting the extent of movement of the switches 18 and 90, respectively, in the open circuit position to maintain the switch 102 in contact with the contact member 110.

When the switch 102 engages the contact member 110, a circuit is established which extends from one end of the secondary winding 54 through conductor 48 to one of the input terminals of the full-wave rectifier 52, from the other input terminal of the rectifier 52 through conductor 86, alternating current winding 58 of reactor 62, conductors 98 and 100, contact member 110, switch 102 and conductor 96 to the other terminal of the secondary winding 54.

At the same time that segments 70 and 71 connect their associated reactor in the energizing circuit, segments 66 and 67, respectively, function to connect the primary winding 50 of the transformer 46 to a suitable source whereby the secondary windings 44 and 54 of the transformer are energized. Simultaneously therewith, one of the associated segments 68 or 69 is actuated to a circuit closing position to establish a circuit to shunt a predetermined section of the resistor 39 whereby only sufficient resistance is retained in circuit with the regulating generator to maintain it so "tuned" that it operates along the linear part of its saturation curve during the regulating operation.

The reactors 60 and 62 are substantially identical having the alternating-current windings 56 and 58, respectively, positioned on a leg of a core member 116 or 118, respectively, each core member being provided with two series-connected direct-current control windings 120—122 and 124—126, respectively, positioned on opposite legs of the core members. As illustrated, the reactors 60 and 62 are each provided with an adjustable leg 128 in the direct-current magnetic circuit of the core member, an eccentric member such as the cam 130 being provided for adjusting the leg 128. A complete description of the structure of the reactors 60 and 62 may be had by reference to my copending application, Serial No. 703,054, filed October 12, 1946 and directed to Reactors.

As illustrated, the direct-current windings 120 and 122 of reactor 60 are connected directly in the load circuit of generator 10 whereby the energization of such windings is in accordance with the load current supplied by the generator 10. On the other hand, the direct-current control windings 124 and 126 are connected across conductors 14 and 16 through an adjustable resistor 132 whereby the saturation of reactor 62 depends upon and is a direct measure of the voltage across generator 10.

In operation, the regulating generator 24 and the main generator 10 are driven by some suitable prime mover (not shown) to supply the load 20 when the switch 18 is in a circuit closing position. It if is desired to regulate for the current flow in the load circuit, the drum 64 is actuated to a position where segments 66, 68 and 70 engage their respective cooperating contact members to connect the primary winding 50 of transformer 46 to be energized. At the same time, a section of resistor 39 is shunted to tune the self-excited regulating generator 24 and the alternating-current winding 56 of reactor 60 is connected in the energizing circuit for the differential field winding 36.

Under the conditions just described, the pattern field winding 34 is energized to cooperate with series field winding 28 to provide maximum excitation for the regulating generator 24 and thereby effectively increase the excitation of generator 10. As will be appreciated, the current flowing from the generator 10 under such starting conditions flows through the series connected control windings 120 and 122 of reactor 60 with the result that the reactance of reactor 60 in the energizing circuit for field winding 36 is so high that the current flow through the energizing circuit and the differential field winding 36 is insufficient to offset the excitation effect of the pattern field winding 34 and the generator 10 is operated to increase the flow of current in the load conductors.

As the current in the load conductors is thus increased to a predetermined value to be regulated, the increase in the flow of direct current in the control windings 120 and 122 of reactor 60 effects an increase in the saturation of reactor 60 to thereby decrease the voltage drop across the reactor and permit the current flow in the energizing circuit to the rectifier 52 and through the differential field winding 36 to increase until the excitation effect of the field winding 36 is equal to and opposite the excitation effect of the pattern field winding 34. Under such conditions, the self-energizing field winding 28 is sufficient to maintain the excitation of regulating generator 24 to control the operation of generator 10 whereby the flow of current in the load conductors will be maintained at the predetermined value.

If for any reason the load current should increase from the predetermined value, the flow of current through control windings 120 and 122 increases the saturation of the reactor 60 with the result that the flow of current in the energizing circuit to the differential field winding 36 increases and the excitation effect of field winding 36 becomes greater than that of the opposed pattern field winding 34 whereby the excitation of the regulating generator 24 is decreased. As the output of generator 24 is decreased, the flow of current in field winding 22 of generator 10 is decreased with the result that the generator 10 is operated to decrease the flow of current in the load conductors to the predetermined value which is to be maintained.

On the other hand, if the load current should decrease from the predetermined value which is to be maintained, then the saturation of reactor 60 is decreased and the voltage drop across the alternating-current winding 56 is increased whereby the current flow in the differential field winding 36 is decreased. As the excitation effect of windings 34 and 36 become thus unbalanced, the excitation effect of the pattern field winding 34 predominates with the result that the output of the regulating generator 24 is increased and consequently the excitation of generator 10 is also increased to return the flow of current in the load conductors to the predetermined regulated value.

If it is desired to regulate for voltage instead of load current, then the drum switch 64 is actuated to a position where segments 67, 69 and 71 engage the associated pairs of contact members to energize transformer 46, shunt a section of resistor 30 and connect the reactor 62 in the energizing circuit for the differential field winding 36. The operation under such conditions is the same as that described for current regulation except that the series-connected direct-current control windings 124 and 126 of reactor 62 are connected across the generator 10 and the saturation of reactor 62 is, therefore, controlled in response to the voltage of the generator.

Where the system is employed for supplying current to a plating bath as the load 20, it is desired to regulate for current as long as the bath 20 is connected across the generator 10. However, when the bath 20 is disconnected as by actuating the switch 18, even though the drum 64 is in the current regulating position, it is desired to then regulate for voltage to prevent an increase in the excitation of the generator 10 with possible damage to the windings of the machine. This is accomplished by the mechanical linkage of switches 18, 90 and 102, it being apparent that movement of the load switch 18 to the open circuit position automatically opens the circuit to the alternating current windings 56 of reactor 60 by the movement of switch 90 and simultaneously therewith connects the alternating current winding 58 of reactor 62 in the regulating circuit as switch 102 engages contact member 110. By thus regulating for voltage as described hereinbefore, damage to the windings of generator 10 is prevented as well as preventing boiling of the plating bath when the switch 18 is again closed.

Whether the regulation is for voltage or current, the system utilizing a reactor, as described, can be utilized for regulating over a wide range. This is apparent, for the air gap in the direct-current magnetic circuit can be readily adjusted by actuating the cam 130 and the connection to the taps of the alternating-current winding 56 or 58 is readily changed. For example, it is found that with the connection to the tap of winding 56, as shown, that the range of adjustment is from 500 to 2500 ampere turns. With the connection made to the intermediate tap, the range is from 1000 to 4000 ampere turns, whereas if the connection is made to the end tap, the range is from 2500 to 5300 ampere turns. Thus with only four turns for the direct-current windings 120 and 122, it is possible to have an extended range of from 500 to 5300 ampere turns.

The system described is efficient in operation and can be readily duplicated. The loss in the direct-current system is negligible as is apparent when the size of the copper conductors utilized for the direct-current control windings 120 and 122 and the current flow therethrough are considered. The regulating response is fast and direct acting in response to variations in the quantity to be regulated from a predetermined value which is to be maintained.

I claim as my invention:

1. In a regulating system for a direct-current generator of the low-voltage, high-current type and which is disposed to be connected by a load switch to a load, the combination comprising, a field winding for the generator, excitation means connected in circuit relation with the field winding and disposed for operation to control the energization thereof, means disposed to be energized for controlling the operation of the excitation means, an energizing circuit including a source of supply and a pair of reactors disposed to be selectively connected in circuit therewith for controlling the energization of said energized means, one of the reactors having a direct-current control winding connected in series circuit relation with the output of the generator and an alternating-current winding disposed to be selectively connected in circuit relation with the energizing circuit to effect operation of the excitation means to regulate the current output of the generator, the other of the reactors having a direct-current control winding connected across the generator and an alternating-current winding disposed to be selectively connected in circuit relation with the energizing circuit to effect operation of the excitation means to regulate the generator voltage, and switching means disposed to be simultaneously operated with the load switch to connect the alternating current winding of said one reactor only when said load switch connects the load to the generator, and to connect the alternating current winding of said other reactor only when said load switch is actuated to interrupt the connection of the load to the generator.

2. In a regulating system for a direct-current generator of the low-voltage, high-current type and which is disposed to be connected by a load switch to a load, the combination comprising, a field winding for the generator, excitation means connected in circuit relation with the field winding and disposed for operation to control the energization thereof, means disposed to be energized for controlling the operation of the excitation means, an energizing circuit including a source of supply and a pair of reactors disposed to be selectively connected in circuit therewith for controlling the energization of said energized means, one of the reactors having a direct-current control winding connected in series circuit relation with the output of the generator and an alternating-current winding disposed to be selectively connected in circuit relation with the energizing circuit to effect operation of the excitation means to regulate the current output of the generator, the other of the reactors having a direct-current control winding connected across the generator and an alternating-current winding disposed to be selectively connected in circuit relation with the energizing circuit to effect operation of the excitation means to regulate the generator voltage, a main switching means disposed for operation to selectively control the selective connections of the alternating-current windings of the reactors, and auxiliary switching means disposed for automatic operation as the load switch is operated independently of the main switching means to connect the alternating current winding of said one reactor only when said load switch connects the load to the generator, and to connect the alternating current winding of said other reactor only when said load switch is actuated to interrupt the connection of the load to the generator.

3. In a regulating system for a direct-current generator of the low-voltage, high-current type and which is disposed to be connected by a load switch to a load, the combination comprising, a field winding for the generator, a self-energizing regulating generator having an armature member connected to the generator field winding for controlling the energization thereof, a pattern field winding for the regulating generator disposed to be energized at a predetermined level of energization, a differential field winding for the regulating generator disposed to be energized in opposition to the energization of the pattern field winding, an energizing circuit including a pair of reactors each of which is provided with a direct-current control winding and an alternating-current winding, the control winding of one of the reactors being connected in series circuit with the current flow from the generator, the control winding of the other reactor being connected across the generator to be energized in accordance with the voltage thereof, and switching means disposed for simultaneous operation with the load switch to selectively connect the alternating-current windings of the reactors in circuit relation with the differential field windings.

4. In a regulating system for a direct-current generator of the low-voltage, high-current type and which is disposed to be connected by a load switch to a load, the combination comprising, a field winding for the generator, a self-energizing regulating generator having an armature member connected to the generator field winding for controlling the energization thereof, a pattern field winding for the regulating generator disposed to be energized at a predetermined level of energization, a differential field winding for the regulating generator disposed to be energized in opposition to the energization of the pattern field winding, an energizing circuit including a pair of reactors each of which is provided with a direct-current control winding and an alternating-current winding, the control winding of one of the reactors being connected in series circuit with the current flow from the generator, the control winding of the other reactor being connected across the generator to be energized in accordance with the voltage thereof, and switching means disposed to be simultaneously operated with the load switch to connect the alternating-current winding of said one of the reactors when the load switch connects the load to the generator, and to connect the alternating-current winding of said other of the reactors when the load switch is moved to interrupt the circuit between the load and the generator.

5. In a regulating system for a direct-current generator of the low-voltage, high-current type and which is disposed to be connected by a load switch to a load, the combination comprising, a field winding for the generator, a self-energizing regulating generator having an armature member connected to the generator field winding for controlling the energization thereof, a pattern field winding for the regulating generator disposed to be energized at a predetermined level of energization, a differential field winding for the regulating generator disposed to be energized in opposition to the energization of the pattern field winding, an energizing circuit including a pair of reactors each of which is provided with a direct-current control winding and an alternating-current winding, the control winding of one of the reactors being connected in series circuit with the current flow from the generator, the control winding of the other reactor being connected across the generator to be energized in accordance with the voltage thereof, and a main switching means disposed for operation to selectively connect the alternating-current windings of the reactors in circuit relation with the differential field winding, and further switching means disposed for simultaneous operation with the load switch to selectively connect the alternating-current windings of the reactors in circuit relation with the differential field windings independent of the operation of the main switching means.

RALPH A. GEISELMAN.

No references cited.